United States Patent [19]
Howze

[11] Patent Number: 5,862,827
[45] Date of Patent: Jan. 26, 1999

[54] MOBILE AND ADJUSTABLE ELEVATED PLATFORM

[76] Inventor: Harry N. Howze, 4730 Hurt Bridge Rd., Cumming, Ga. 30040

[21] Appl. No.: 929,567

[22] Filed: Sep. 15, 1997

[51] Int. Cl.⁶ .................................................. E04H 15/02
[52] U.S. Cl. ......................... 135/901; 135/900; 135/912; 135/140; 135/141; 135/87; 52/123.1; 52/143; 43/1
[58] Field of Search ............................ 43/1; 135/87, 139, 135/140, 141, 115, 116, 117, 901, 900, 905, 912; 52/263, 118, 67, 123.1, 126.1, 143

[56] References Cited

U.S. PATENT DOCUMENTS

| | | |
|---|---|---|
| 4,067,346 | 1/1978 | Husted . |
| 4,718,716 | 1/1988 | Chrisley, Jr. ................................... 43/1 |
| 4,719,716 | 1/1988 | Chrisley, Jr. . |
| 5,102,179 | 4/1992 | Royer ....................................... 296/26 |
| 5,241,772 | 9/1993 | Hall . |
| 5,327,993 | 7/1994 | Stark, Sr. ................................. 182/179 |
| 5,647,159 | 7/1997 | Latschaw . |

*Primary Examiner*—Christopher Kent
*Assistant Examiner*—Yvonne Horton-Richardson
*Attorney, Agent, or Firm*—William B. Noll

[57] ABSTRACT

Invention relates to an environmentally protected, mobile and adjustable elevated platform, such as for observation, or as a hunting blind. The platform is supported on a mobile stand by plural telescopic legs, and a centrally positioned telescopic lifting mechanism. The observation enclosure is formed by wall panels hingedly secured to the platform, and a roof panel secured to one of the wall panels. Access means to the enclosure, in the form of a door and extension ladder, are disclosed.

6 Claims, 3 Drawing Sheets

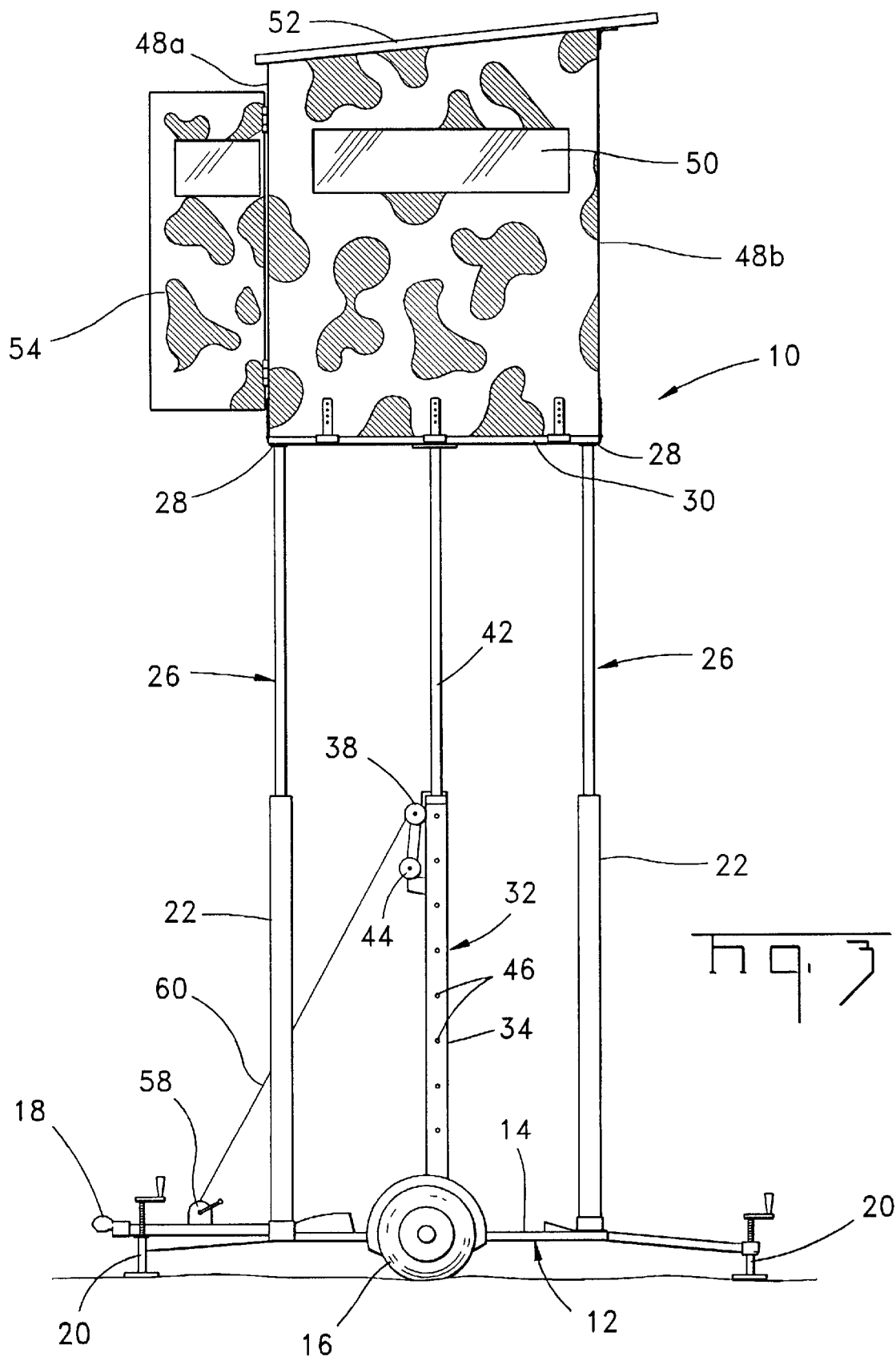

5,862,827

MOBILE AND ADJUSTABLE ELEVATED PLATFORM

FIELD OF INVENTION

This invention relates to the field of protected, elevated, portable platforms for observing an automobile race from the infield, for example, or more particularly as a hunting blind for viewing and killing game animals, such as deer.

BACKGROUND OF THE INVENTION

Hunting blinds and stands used by hunters are commonly made of wood or fabric materials and often painted or otherwise camouflaged to blend with the surroundings to conceal the hunters from the game they are seeking. Some hunting blinds and stands require the hunter to assume an uncomfortable crouched sitting position and then stand to shoot as the animal approaches the stand, while others have windows or flaps which pivot outwardly or upwardly in order to provide visibility or to aim the weapon at the game. This movement can be seen by the animals and will often frighten them away, or at best limit the hunter's opportunity to bag the game.

There are a number of prior art patents directed specifically to hunting blinds, including both on ground and elevated structures, such as, (a) U.S. Pat. No. 5,241,772, to Hall, discloses a hollow cylindrical hunting blind supported on the ground or on a tower that is formed of elongated arcuate panels and a domed roof, where the panels thereof simulate tree bark, and includes sliding observation windows, and a releasable ladder;

(b) U.S. Pat. No. 4,719,716, to Chrisley, Jr., discloses a cylindrical hunting blind which has external vertical frame members and a conical overhanging roof, a side wall having window apertures with independently movable curved outer facing window coverings and flat inside facing windows, where the outer window coverings and inner windows are hinged to swing upwardly and outwardly and can be opened from inside the blind and the inside windows are held in the vertical position by hook and loop fastener latches;

(c) U.S. Pat. No. 5,647,159, to Latschaw, discloses a low profile, portable disassemblable blind for water fowl hunting, including a peripheral side frame and a slidable top, and one or more head holes for the hunters to project their heads above the top for observation; and (d) U.S. Pat. No. 4,067,346, for Husted, discloses a tent-like structure comprising a collapsible hunting blind made up of sectional corner posts which are hinged together at their sides so the sections can be folded against each other, divisional top struts which press the tops of the posts apart and which have pins through them so each slat can be folded on itself, and an enclosing cover which is reversible and has different designs on its opposite sides.

The present invention is distinguishable from this prior art by being mobile and adjustable, where the "blind" enclosure is formed by plural hinged panels. The manner by which the present invention distinguishes over such prior art will become apparent in the description which follows, particularly when read in conjunction with the accompanying drawings.

SUMMARY OF THE INVENTION

The present invention is directed to a mobile and adjustable platform system, readily towed and erected, for use in observation or as a hunter's blind. The invention comprises a generally rectangular platform mounted to and above a plurality of vertically oriented telescopic legs secured to a towable mobile sand, and a centrally disposed lifting mechanism secured to the mobile stand and positioned to elevate the platform to a preselected height. The system includes plural wall panels, each having at least one window therein, hingedly mounted to the respective sides of the platform to allow for pivotally moving the wall panels to form an upright enclosure about the platform. For coverage, a roof panel hingedly mounted to one of the wall panels is provided. Further, access means, in the form of a door within one wall panel, is provided in the enclosure, with an extension ladder extending between the mobile stand and the access means.

Accordingly, an object of this invention is to provide a portable and mobile hunter's blind that allows for easy observation of the surroundings while providing protection to the inhabitants from inclement weather.

A further object hereof is to provide an easily erectable blind or observation platform that is readily transportable to a variety of locations.

These and other objects will become apparent to skilled hunters from the specification which follows.

BRIEF DESCRIPTION OF DRAWINGS

FIG. 3 is a partial side elevational view of the platform of this invention, showing the erected observation enclosure atop the movable platform.

DETAILED DESCRIPTION OF PREFERRED EMBODIMENT

Figure 1:
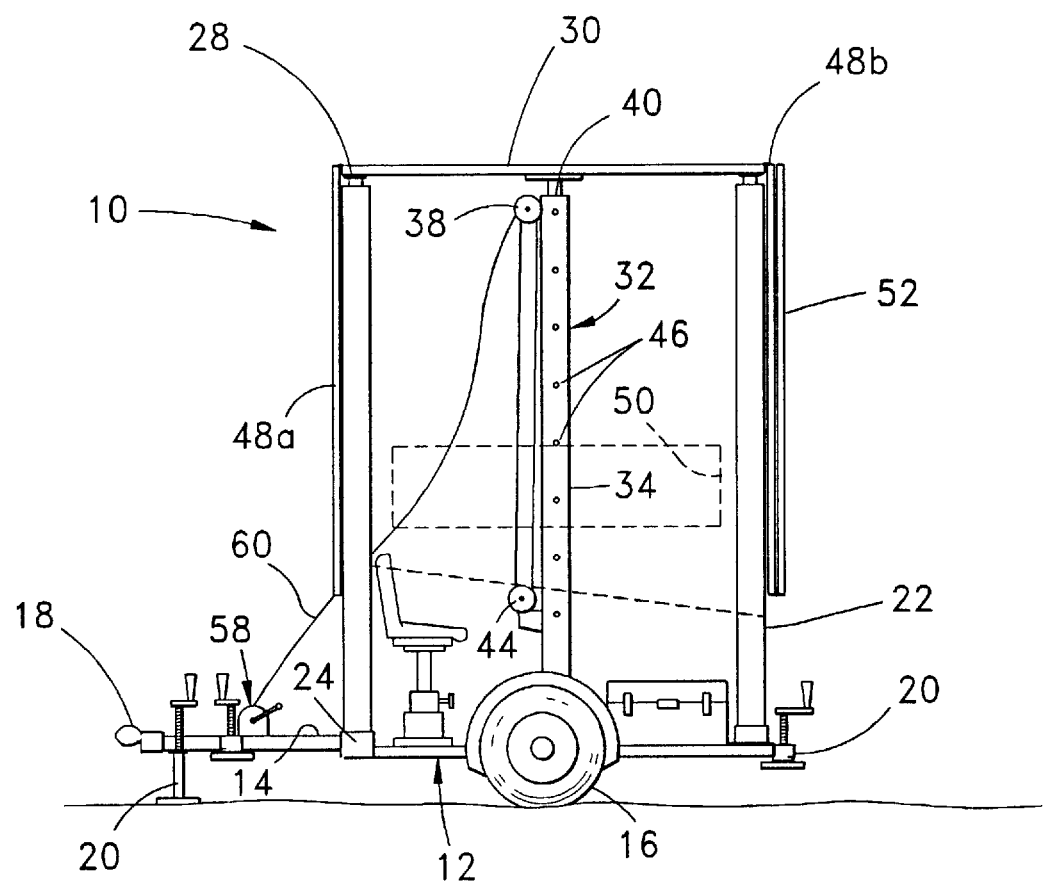
FIG. 1 is a side elevational view of the mobile and adjustable elevated platform according to this invention, showing the invention in the retracted or pre-setup position, where the platform hereof includes plural pivotal wall panels hingedly secured to the platform, where a side panel has been removed so as to reveal otherwise hidden components.

The present invention is directed to a mobile and adjustable, elevated hunting blind, or observation tower, that may be readily transported and erected at a selected location. The invention is illustrated in the several views, where like reference numerals identify like components or features throughout the Figures.

FIG. 1 is a side view of the mobile and adjustable structure 10 of this invention, illustrating said structure in a pre-setup position, as it might be towed on a mobile stand 12. The stand 12 comprises a generally horizontal bed 14, a pair of wheels 16, a towing hitch 18 for mounting to a complementary connector on a car or truck, not shown, and plural bed adjusters 20 for positioning and stabilizing the bed in a horizontal alignment.

Mounted to the bed 14 are plural fixed tubular members 22, typically four in number arranged along the respective edges of the bed, where such tubular members may be secured thereto by a T-flange 24, as known in the art. Cooperating with each said fixed tubular member 22 is a slidably received telescoping member 26, see FIGS. 2 and 3. Secured to the top 28 of each said telescoping member 22 may be a T-flange, or other suitable fixture, for mounting and securing the generally rectangular mobile platform 30 to the respective tops 28.

Figure 2:
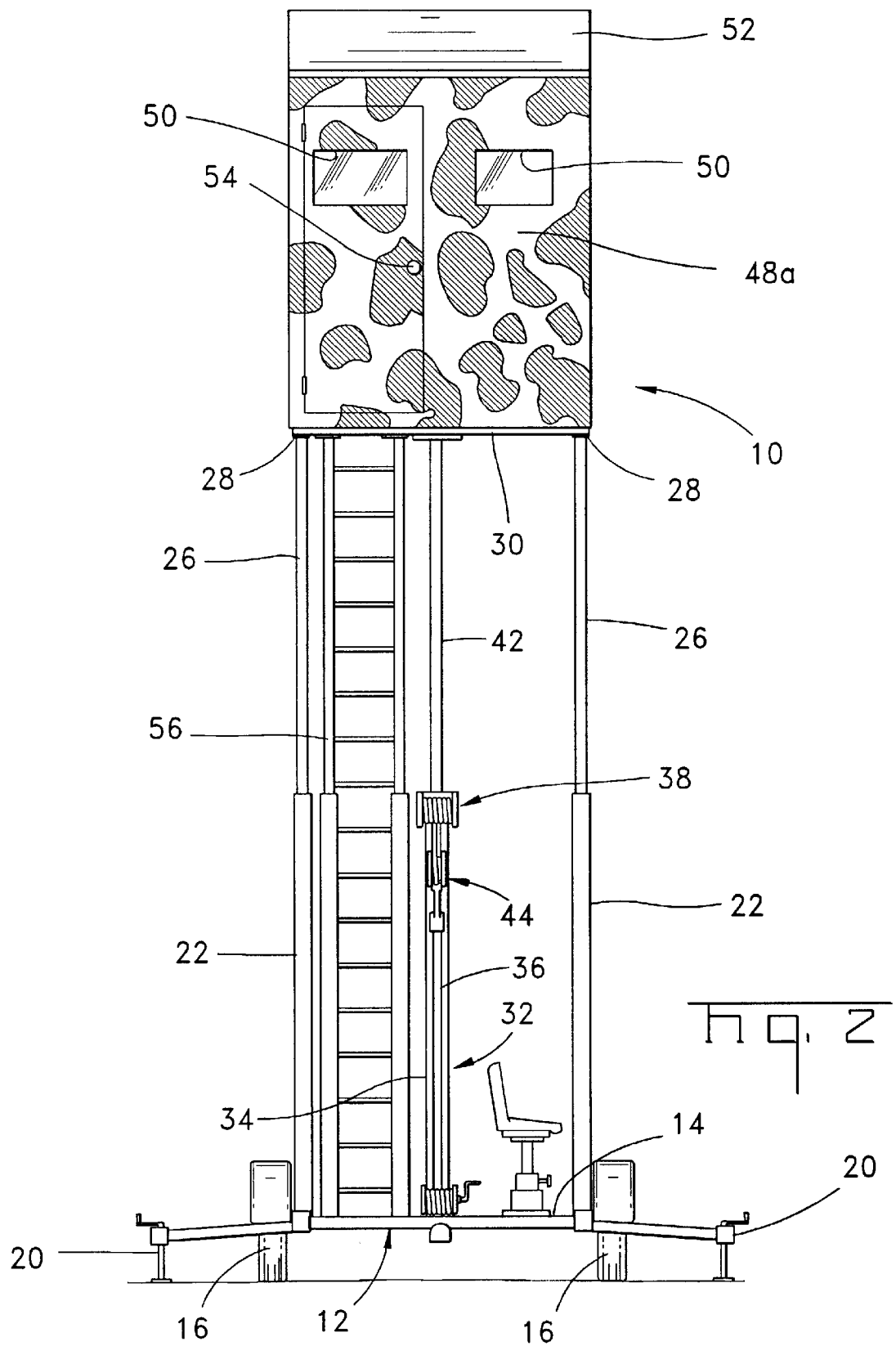
FIG. 2 is a front elevational view of the mobile and adjustable elevated platform hereof, illustrating such platform in the fully extended position.

To elevate the platform 30, a centrally disposed lifting mechanism 32 is provided. As best seen in FIGS. 1 and 2, the lifting mechanism 32 comprises a first fixed, C-configured member 34, secured to the bed 14, having a longitudinal slot 36 therealong, and a fixed pulley 38 mounted in close proximity to the top 40 thereof. The C-configured member 34 is sized to telescopically receive a tubular member 42, having a second or lifting pulley 44 mounted thereon, where said pulley 44 projects outwardly therefrom through said slot 36. By means to be described hereinafter, the respective pulleys 38, 44 cooperate to telescopically extend tubular member 42 upward, and hence elevate the platform 30 to a preselected height. The respective members 34, 42 are provided with plural registration means, preferably in the form of lateral through holes 46, to receive a pin, not shown, to fix the platform at the preselected height and prevent a premature change in the relationship of the members 34, 42.

To provide an enclosure for the platform 30, each edge thereof includes a hingedly mounted wall panel 48, typically formed of aluminum, where each wall panel is provided with one or more windows 50, or openings, for observation. Once the wall panels 48 are fully pivoted to an upright position, with the edges of adjacent wall panels aligned together to form the enclosure as seen in FIGS. 2 and 3, the adjoining edges may be secured by a loop and hook arrangement, not shown, or by other conventional interior fastening means known in the art. The enclosure is provided with a roof panel 52 hingedly secured to one of the wall panels 48, see FIG. 1.

As best seen in FIG. 3, two opposing wall panels 48a, 48b, the sized differently, i.e., panel 48a is higher than wall panel 48b, so that the roof panel is slanted to facilitate snow and water drain off. Additionally, wall panel 48b is provided with a hinged door 54 for access to the enclosure. To reach the door 54, and therefor the enclosure, an extension ladder 56, FIG. 2, is provided, extending from the bed 14 to the platform 30.

To elevate the platform 30, after first preparing and securing the enclosure, as noted in FIGS. 1 and 3, a ratcheting crank 58, hand or motor operated from a 12-volt battery, for example, is provided on the bed 14. With a pulley cable 60 extending therefrom to the fixed pulley 38, which in turn is cooperatively connected to the movable or lifting pulley 38, the ratcheting crank 58 is rendered operable to raise the platform 30 to the preselected position, note the coming together of the pulleys 38, 44, then locked by the appropriate registration means or holes 46.

Due to its light weight and ease of mobility and erection, the enclosure may be sized to accommodate plural occupants, including chairs and food storage to ensure their comfort.

While the invention has been described in it preferred embodiment, it may become obvious to those skilled in the art that changes, additions and modifications may be made thereto without departing from the spirit and scope of this invention, and that no undue limits should be imposed thereon except as set forth in the following claims.

What is claimed is:

1. A mobile and adjustable elevated platform to environmentally protect and conceal an observer or hunter of game, said elevated platform comprising a mobile stand for mounting said elevated platform;

a generally rectangular platform mounted to and above a plurality of vertically oriented telescopic legs secured to said mobile stand, and a centrally disposed lifting mechanism secured to said mobile stand and positioned to elevate said platform to a predetermined height;

plural wall panels, each having at least one window therein, hingedly mounted to the respective sides of said platform to allow for pivotally moving said wall panels to form an upright enclosure about said platform;

a roof panel hingedly mounted to one said wall panel to provide a cover to said upright enclosure;

an access means in the form of a door within one said wall panel; and, an extension ladder extending between said mobile stand and said access means.

2. The mobile and adjustable elevated platform according to claim 1, wherein said centrally disposed lifting mechanism includes at least a pair of slidably engaging telescopic members having registration means therelong for securing said telescopic members in a telescopic relationship, so as to prevent a premature change in said telescopic relationship, and a ratcheting crank mechanism to vertically extend said telescopic members.

3. The mobile and adjustable elevated platform according to claim 2, including adjusting and stabilizing means on said mobile stand to horizontally position said mobile stand relative to the underlying ground.

4. The mobile and adjustable elevated platform according to claim 2, including a battery operated motor to vertically extend said members.

5. The mobile and adjustable elevated platform according to claim 1, wherein a pair of opposed wall panels of said upright enclosure is sized differently, and the roof panel is hingedly secured to the largest of the pair of opposed wall panels, whereby said roof panel is slanted to facilitate snow and rain removal.

6. The mobile and adjustable elevated platform according to claim 2, wherein said ratcheting crank mechanism includes a first fixed pulley on a first said slidably engaging telescopic member, and a second pulley on a second said slidably engaging member.

* * * * *